Figure 1:
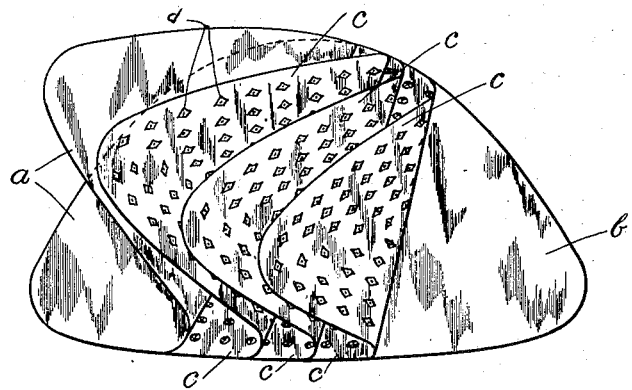

May 12, 1925.  1,537,848
D. B. MACDONALD
TOE PUFF, STIFFENER, INSOLE, AND LIKE PARTS FOR BOOTS AND SHOES
Filed May 31, 1921  2 Sheets-Sheet 1

Inventor
David Baird Macdonald
by Connolly Bros
Attorneys

May 12, 1925.  1,537,848
D. B. MACDONALD
TOE PUFF, STIFFENER, INSOLE, AND LIKE PARTS FOR BOOTS AND SHOES
Filed May 31, 1921  2 Sheets-Sheet 2

Inventor
David Baird Macdonald
by Connolly Bros
attorneys

Patented May 12, 1925.

1,537,848

UNITED STATES PATENT OFFICE.

DAVID BAIRD MACDONALD, OF LEICESTER, ENGLAND.

TOE PUFF, STIFFENER, INSOLE, AND LIKE PARTS FOR BOOTS AND SHOES.

Application filed May 31, 1921. Serial No. 473,636.

*To all whom it may concern:*

Be it known that I, DAVID BAIRD MACDONALD, a subject of the King of Great Britain, residing at Leicester, in the county of Leicester, England, have invented certain new and useful Improvements in or Relating to Toe Puffs, Stiffeners, Insoles, and like Parts for Boots and Shoes, of which the following is a specification, reference being had therein to the accompanying drawing.

This invention relates to toe-puffs, stiffeners, insoles and like parts for boots and shoes and has particular reference to such articles composed of a plurality of cut out layers of material between which a stiffening agent is interposed which agent binds the layers together.

The invention concerns articles of the above mentioned type wherein is employed a stiffening agent in solution in a solvent of volatile character, said articles being appropriate for the method of use which consists in storing them, while in a normal moist and pliable condition, in air-tight tins or containers which, by retention of the spirit vapours emanating from the solvent, keep the articles in a moist or pliable condition until they are required for insertion into the work, so that upon removal from the tin or container they are ready for immediate use without preliminary softening treatment and will, after being lasted and incorporated in a boot or shoe, set hard and firm when the spirituous solvent passes off.

The object of the present invention is to produce a very cheap but effective form of stiffener article of the kind just referred to, and while the invention mainly concerns toe-puffs and stiffeners, it may be applied to insoles or even outer soles and other like parts of boots and shoes.

According to the invention the plural layers consist wholly or mainly of paper or like material. The interior layer or layers may be perforated, reticulated, corrugated, crinkled, crumpled, embossed or otherwise treated to form cells to carry and retain the stiffening agent. Or said interior layer or layers may be of absorbent or porous character for the same purpose. The outer or face layers, back and front, are preferably plain but they may, without perforation, be corrugated, embossed or similarly treated to assist in retaining the stiffening agent.

For example, the inner layer or layers may consist of plain paper such as brown craft, cartridge paper, news paper, vegetable parchment, suitable strawboard, or blotting paper. The outer face layers may consist of ordinary paper preferably of smooth surface.

I find that two, three or four inner layers of paper combined with an outer front and back layer of paper and the intermediate stiffening agent produce a good stiffener article, but obviously the number of inner layers may be varied in accordance with the degree of stiffness the article is required to possess.

I may substitute one or more of the inner paper layers by a corresponding layer or layers of a reticulated material such as muslin, canvas, woven paper or the like, such material being used in combination with paper outer layers.

Or one or both of the external or face layers may consist of fabric such as duck, croydon or the like in combination with inner layers of paper.

In the accompanying drawings, to which reference will presently be made, different examples of toe stiffeners covered by the invention are illustrated, each figure representing the layers, which compose the article, as being partly separated for the purpose of clearly showing the various combinations.

In Figure 1 the toe stiffener shown is composed wholly of paper and comprises a face layer *a* back layer *b* and three inner layers *c* the latter having perforations or embossments *d*.

Figure 2:
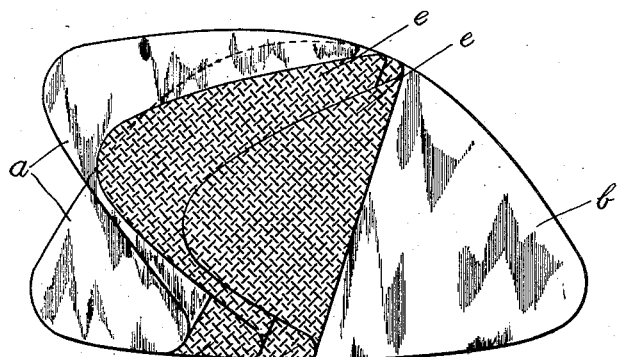

The article shown in Figure 2 is comprised by a paper face layer *a* a paper back layer *b* and two inner layers *e* of reticulated textile material such as muslin or canvas.

Figure 3:
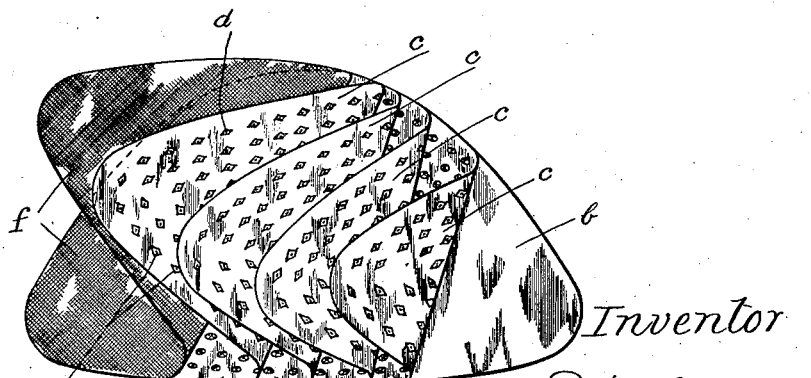

In Figure 3 the article shown is made up of a face layer *f* of textile material such as white croydon, a back layer *b* of paper, and four inner layers *c* of paper.

Figure 4:
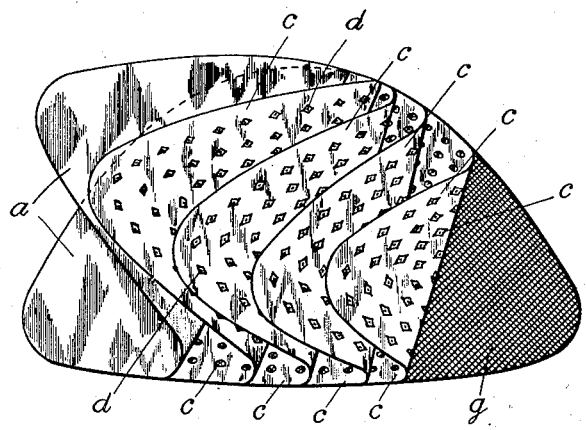

In Figure 4 the article is composed of a paper face layer *a*, a textile back layer *g* such as of duck, and four inner layers *c* of paper.

Figure 5:
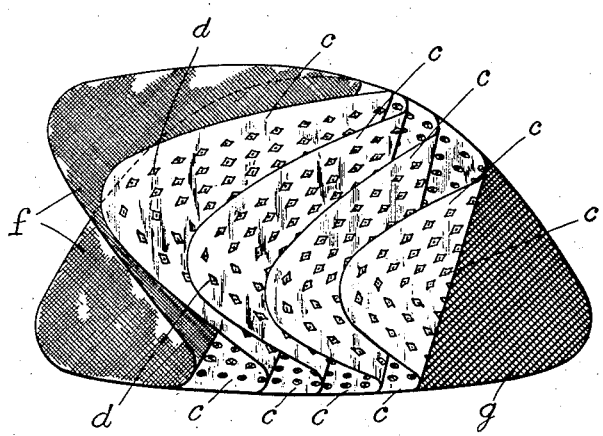

The article illustrated in Figure 5 has a textile face layer *f* such as of white croydon, a textile back layer *g* such as duck, and four middle paper layers *c*.

In the articles shown in Figures 3, 4 and 5 the inner layers *c* of paper are perforated or embossed at *d*.

The stiffening agent I prefer to use consists of a pasty solution of celluloid, cellulose esters or a mixture of same in a suitable solvent such as ketone, amyl or butyl acetate and diluents such as alcohols, benzol and such like. I also prefer to add to the stiffening agent, leather dust or some other suitable inert matter to act as a binding medium to prevent exudation of the stiffening agent from between the layers composing the article. Instead of leather dust, I may use mixed dust such as that collected in the scouring process in shoe factories. Or I may use the dust of pulp board, various fabrics and paper pulp.

As an example, the stiffening agent may be composed of:—

|  | Per cent |
|---|---|
| Celluloid | 20 |
| Leather dust | 10½ |
| Methyl acetone | 34½ |
| Benzol | 35 |

The proportion of the substances may be varied.

In making the articles, the stiffening agent is spread upon the layers of material which are then assembled and pressed together with sufficient pressure to cause them to adhere closely without squeezing out the stiffening agent.

It will be understood that the outer surface of each exterior layer i. e. the back layer $b$ or $g$ and front layer $a$ or $f$, is not coated with the agent but is left dry. One or each of these outer surfaces may be treated with a water soluble colloidal or gelatinous material as described in my copending United States patent application Serial No. 410406 filed 15th September, 1920.

By making the articles wholly or mainly of paper, I am able to produce them very cheaply, and I find by experiment that the materials herein referred to serve in an efficient manner as carriers for the stiffening agent, and that the whole, when set, constitutes a firm and hard article suitable for the intended purpose.

What I claim then is:—

1. Toe-puffs, stiffeners, insoles and like parts for boots and shoes composed of a plurality of cut out layers of material between which is interposed a stiffening agent in solution in a solvent of volatile character, characterized by the feature that the plural layers consist of paper, the outer layers being coated with a water soluble colloidal or gelatinous material which serves to prevent evaporation of the water insoluble stiffener solvent, substantially as and for the purpose herein described 2. Toe-puffs, stiffeners, insoles and like parts for boots and shoes composed of a plurality of cut out layers of paper between which is interposed a stiffening agent in solution in a solvent of volatile character, the interior layer or layers being corrugated, crinkled, crumpled or embossed for the purpose of carrying and retaining the stiffening agent, and the outer layers being coated with a water soluble colloidal or gelatinous material which serves to prevent evaporation of the water insoluble stiffener solvent, substantially as described.

3. Toe-puffs, stiffeners, insoles and like parts for boots and shoes composed of a plurality of cut out layers of paper between which is interposed a stiffening agent in solution in a solvent of volatile character, the outer layers, back and front, being formed with cells to assist in retaining the stiffening agent, and being coated with a water soluble colloidal or gelatinous material which serves to prevent evaporation of the water insoluble stiffener solvent, substantially as described.

4. Toe-puffs, stiffeners, insoles and like parts for boots and shoes composed of a plurality of cut out layers of material of paper between which is interposed a stiffening agent in solution in a solvent of volatile character, one or each of the outer surfaces being treated with a water soluble colloidal or gelatinous material, said material serving to prevent evaporation of the water insoluble stiffener solvent, substantially as herein described.

5. Toe-puffs, stiffeners, insoles and like parts for boots and shoes composed of a paper front layer, a paper back layer, a plurality of paper inner layers, and a stiffening agent in solution in a solvent of volatile character interposed between said layers, the inner layers being formed with cells for the purpose of retaining the stiffening agent, and the said front layer being treated with a water soluble colloidal or gelatinous material which serves to prevent evaporation of the water insoluble stiffener solvent, substantially as described.

In testimony whereof I affix my signature in presence of two witnesses.

DAVID BAIRD MACDONALD.

Witnesses:
R. W. C. TAYLOR,
GEORGE LESTER.